(12) United States Patent
Dong

(10) Patent No.: US 7,650,953 B2
(45) Date of Patent: Jan. 26, 2010

(54) HYDROGEN HYBRID POWER ELECTRIC VEHICLE

(76) Inventor: Yintan Dong, Shengkejidalou, No. 542, Beijin Road, Kunming, Yunnan 650051 (CN)

( * ) Notice: Subject to any disclaimer, the term of this patent is extended or adjusted under 35 U.S.C. 154(b) by 414 days.

(21) Appl. No.: 11/411,598

(22) Filed: Apr. 25, 2006

(65) Prior Publication Data
US 2007/0084651 A1  Apr. 19, 2007

(30) Foreign Application Priority Data
Oct. 18, 2005  (CN)  ................ 2005 1 0011068

(51) Int. Cl.
*B60K 6/20* (2007.10)
(52) U.S. Cl. ............... 180/65.21; 60/320; 429/19; 429/20; 429/21; 55/355; 585/272
(58) Field of Classification Search ............. 180/65.2; 181/213; 60/320; 429/19, 20, 21; 55/355; 585/272
See application file for complete search history.

(56) References Cited

U.S. PATENT DOCUMENTS

| 4,774,396 | A | * | 9/1988 | Salit et al. ............ 219/553 |
| 5,363,745 | A | * | 11/1994 | Lin ...................... 99/306 |
| 5,382,271 | A | * | 1/1995 | Ng et al. ................ 48/61 |
| 5,412,946 | A | * | 5/1995 | Oshima et al. ......... 60/286 |
| 5,861,137 | A | * | 1/1999 | Edlund ................. 423/652 |
| 6,077,186 | A | * | 6/2000 | Kojima et al. .......... 477/3 |
| 6,082,084 | A | * | 7/2000 | Reimers et al. ........ 56/11.9 |
| 6,245,303 | B1 | * | 6/2001 | Bentley et al. ......... 422/193 |
| 6,348,278 | B1 | * | 2/2002 | LaPierre et al. ........ 429/17 |
| 6,461,408 | B2 | * | 10/2002 | Buxbaum ............... 95/55 |
| 6,508,210 | B2 | * | 1/2003 | Knowlton et al. ....... 123/3 |
| 2004/0076561 | A1 | * | 4/2004 | Kajiura et al. ......... 422/187 |
| 2005/0133002 | A1 | * | 6/2005 | Hoetger et al. ......... 123/299 |
| 2006/0059897 | A1 | * | 3/2006 | Benz et al. ............. 60/286 |
| 2006/0065520 | A1 | * | 3/2006 | Ballantine et al. ...... 204/279 |

FOREIGN PATENT DOCUMENTS

CN  85 1 09487  7/1987
CN  94116320.2  3/1996

* cited by examiner

*Primary Examiner*—Lesley Morris
*Assistant Examiner*—Bryan A Evans
(74) *Attorney, Agent, or Firm*—Ladas & Parry LLP

(57) ABSTRACT

The present invention relates to the vehicle field, more particularly, to a hydrogen hybrid power electric vehicle which combusts hydrogen instead of gasoline or diesel, characterized in that an alcohol cracking hydrogen generator is in serial connection in the line of an exhaust pipe of the hydrogen engine of the vehicle which can produce hydrogen on board by cracking alcohol using the afterheat of the exhaust gases so as to drive the vehicle to run and the electric motor to generate power. When a vehicle is driven by a hydrogen engine according to the present invention combined with an electric motor, ultra-low emission or zero-emission can be reached. Plenty of raw materials can be used to produce hydrogen such as sugarcane, maize, sweet broomcorn and cassava etc. all of which are inexhaustible regenerative resources. The alcoholic materials used to produce hydrogen can be 50°-65° hydrous methanol or ethanol, which involve easy processing technology and low costs. It is also very safe and convenient to store, transport and supply in network liquid alcohol.

7 Claims, 4 Drawing Sheets

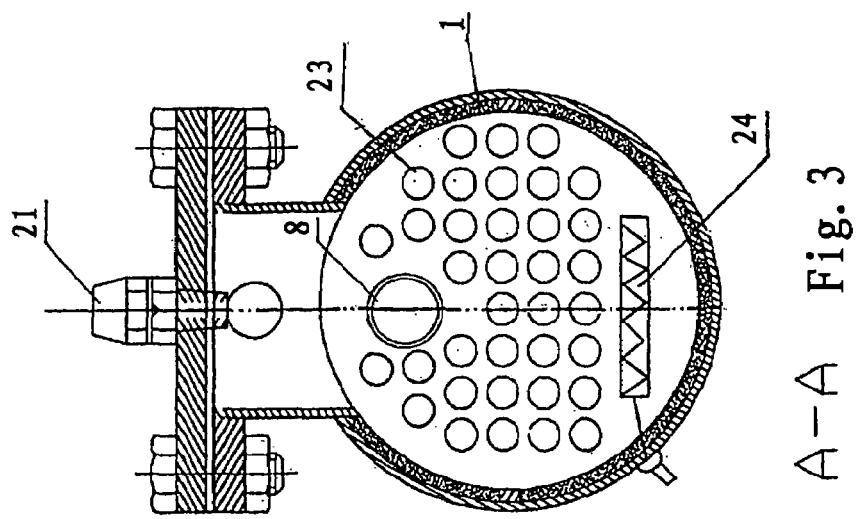
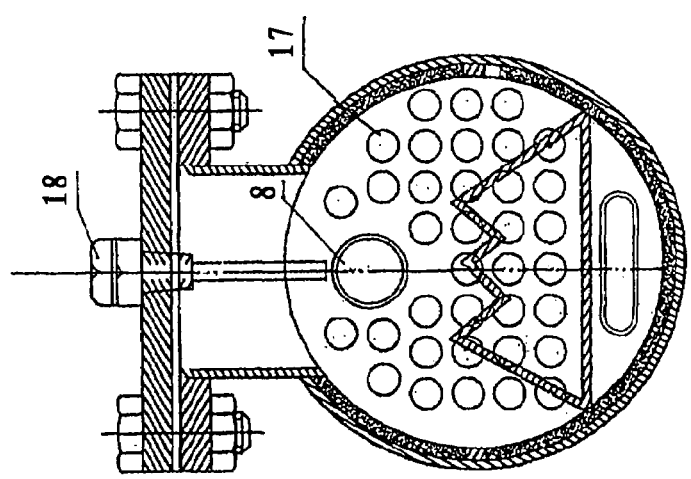
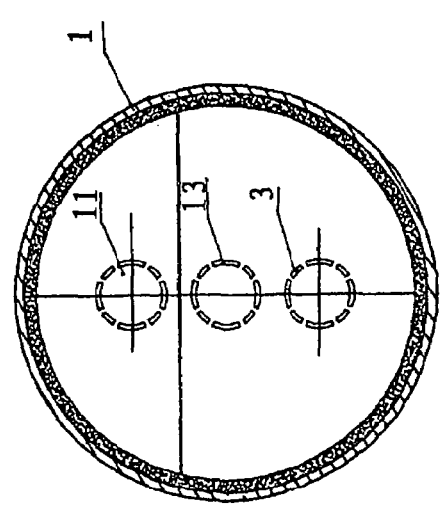

HYDROGEN HYBRID POWER ELECTRIC VEHICLE

TECHNICAL FIELD

The present invention relates to the vehicle field, more particularly, to hydrogen hybrid power electric vehicles which are driven by combusting hydrogen produced by heating and cracking alcohol as fuel for their hydrogen engines.

BACKGROUND ART

Hydrogen is an ideal fuel for human beings in the 21st century. With hydrogen as the fuel for vehicles, humankind can completely break away with its dependency on petroleum and eliminate damages of exhaust gases to the environment from the source. However, the cost for producing hydrogen is as high as 4 to 12 times that for gasoline. Hydrogen has to be canned in liquid state with a pressure as high as 35-70 MPa or a temperature as low as −252° C. in order to achieve the specified mileage of continuous running, which poses a grave threat to safety. Further, infrastructure construction for networked hydrogen supply involves huge investment. All of these holdback the progress of commercialization of hydrogen vehicles and hydrogen fuel cell vehicles. Therefore, it is generally accepted by governments and the industry of vehicles that a hybrid power electric vehicle is the most feasible solution to energy and environmental problems.

A hybrid power electric vehicle is driven jointly by an oil-fueled engine and an electric motor. The vehicle is driven first by electricity stored in a pile of batteries when running downtown and is switched to be driven by a standard oil-fueled engine when arriving on an expressway. As the original power of which comes from an oil-fueled engine, such a kind of hybrid power electric vehicle still needs to consume gasoline. However, compared to a standard oil-fueled vehicle or a purely electric vehicle, it can bring about the effects of decreasing oil consumption, reducing emission pollutants and extending continuous running hours. People have seen that a hybrid power electric vehicle is only a transitional mode, which fails to finally get rid of dependency on oil resources and uproot the harm of emissions done to the humankind. In order to achieve the final purpose of energy conservation and environmental protection, it is a relatively practical choice to resort to alcohol (hydrogen) fueled instead of oil fueled. However, key technology involved in realization of alcohol (hydrogen) fueled instead of oil fueled is the hydrogen engine, a generator of hydrogen crack-produced by heating alcohol.

The inventor of the present invention, who has been involved in long-term research and development for producing hydrogen by alcohol cracking and supplying the same, has obtained major breakthroughs and achievements in the same field and has been granted with a series of patents successively such as the patents No. CN8510947 and ZL941164320.2.

In view of the disadvantages of hybrid power electric vehicles in the world and imminent social and market economic requirements, the present invention is directed to provide a hydrogen hybrid power electric vehicle, which does not use any gasoline/diesel but uses hydrogen as the fuel for its engine for a whole journey, wherein the hydrogen is produced by directly cracking alcohol into a gas with a rich content of hydrogen ($3H_2+CO_2$). With low cost and high thermal efficiency, the hydrogen hybrid power electric vehicle according to the present invention, is of a new generation configured much more properly and pollution-free, which can be combined and matched with a hybrid power electric vehicle. The present hybrid power electric vehicle hybrids the power of a hydrogen engine and the power of an electric motor.

The present invention is achieved by a configuration as the following: A hydrogen hybrid power electric vehicle, comprises: a chassis (I), a vehicle shell, a steering wheel, wheels (IV), a brake, an engine, an electric motor (II), a battery group (III), a fuel tank, a control circuit and various kinds of control valves connected to the lines of the control circuit, characterized in that a hydrogen engine is provided therein, an outlet line of the battery group (III) is connected to a cold-starting electric heater which is in serial connection in an alcohol cracking hydrogen generator on the line of an exhaust pipe of the hydrogen engine, an exhaust outlet pipe of the hydrogen engine is connected to an alcohol cracking hydrogen generator which is further connected to a silencer end pipe through an exhaust bypass valve, a hydrogen outlet pipe of the alcohol cracking hydrogen generator is connected to a hydrogen nozzle at an inlet end of the hydrogen engine and an alcohol inlet pipe of the alcohol cracking hydrogen generator is connected to an alcohol container; wherein the alcohol cracking hydrogen generator comprises an external alcohol container, a hydrogen containing canister, the alcohol inlet pipe, hydrogen outlet pipes, control valves, a hydrogen pump, a pressure stabilizer valve and a control circuit, in which the alcohol inlet pipe has one end connected to the alcohol container and the other end connected to the inlet end of the alcohol cracking hydrogen generator, the hydrogen outlet pipe has one end connected to an outlet end of the alcohol cracking hydrogen generator and the other end connected to the hydrogen containing canister and a hydrogen pressure stabilizer valve is provided between the hydrogen outlet pipe and the hydrogen nozzle at the inlet end of the engine.

The exhaust pipe of the hydrogen engine branches off outside the alcohol cracking hydrogen generator into an exhaust inlet pipe and an exhaust bypass pipe, the exhaust bypass pipe is provided with an exhaust bypass valve, the cylinder-shape alcohol cracking hydrogen generator is provided therein with an exhaust passage joint, a silencer end pipe, an exhaust silencer hole, an exhaust silencer pip, a silencer throughole baffle, silencer pipes, silencer baffles, a reaction chamber and a vaporizer overheating chamber, in which the reaction chamber is in communication with the vaporizer overheating chamber through a communicating pipe, the reaction chamber and the vaporizer overheat chamber are provided at the bottom thereof with a cold-starting electric heater, the reaction chamber and the vaporizer overheat chamber are provided at the top thereof with a thermal control thermoelectric couple, an interface for the hydrogen outlet pipe and an interface for the alcohol inlet pipe. A flange cover of the reaction chamber is welded with the interface for the hydrogen outlet pipe, the interface for the hydrogen outlet pipe is connected to the hydrogen pump, the hydrogen containing canister, the hydrogen stabilizer valve and the hydrogen nozzle on the engine cylinder head or a mixer on a carburetor-like engine inlet pipe, the reaction chamber is provided on the top thereof with a cover in which catalyst can be filled, a screwed pipe is welded on a hole in the cover for receiving therein the thermal control thermoelectric couple, the thermal control thermoelectric couple has its line connected to a thermal control electronic meter, the bottom of the reaction chamber is filled with metal wire web and magnetic ring and the spaces inside the reactor chamber and that between outer walls of perforating array pipes are filled with alcohol cracking catalyst. The vaporizer overheating chamber is welded on the top thereof with the interface for the alcohol inlet pipe, an outer end of which is connected to the alcohol container and the alcohol inlet pipe. The vaporizer overheating chamber and the reaction chamber, which are made of copper, stainless steel or corrosion-proof cast iron material, are in the form of completely enclosed cylindrical shells with front and rear surfaces thereof evenly disposed with perforating array pipes in round comby shape. The materials used by the hydrogen engine for producing hydrogen are alcoholic material, which are mainly composed of hydrous methanol, ethanol, mixed alcohol or non-sulfuric hydrocarbon with a ratio of alcohol to water as 1:0-1.17. A return flow system composed of a bottom insertion pipe, an electromagnetic valve, an alcohol pipe for alcohol re-cracking is provided between the alcohol container and the hydrogen containing canister. A hydrogen storing dephlegmator (W) in the hydrogen containing canister contains therein hydrogen storing material, which can be selected from any of the following hydrogen storing materials such as platinum, palladium, titanium and nickel alloy, active carbon and nano-carbon fibre. The cold-starting electric heater is either of a micro-wave heater or an infrared radiation heater with a capacity of 1.5~3 KW. The alcohol cracking hydrogen generator cracks alcohol at a temperature in the range of 200° C.-300° C.

The present invention has the following prominent advantages compared to the existing technology of hybrid power vehicles in the world:

1. 100% hydrogen (alchol) fueled instead of gasoline/diesel fueled improves greatly the efficiency of combustion in a modern engine. The electric motor's emission equals to zero when the present invention is combined with an electric motor to power a vehicle. Alcohol is a kind of regenerative energy. The final emission for alcohol to be used as the fuel is vapor.

2. 100% hydrogen fueled instead of gasoline/diesel fueled enables breaking away primarily from the dependency on oil resources. Gasoline/diesel combined with hydrogen can be applied with a substitution percentage ranging from 0-100% which can be adjusted as required in order to be adapted to the practical situation during the transitional period from the old energy to a new one. Gasoline/diesel is still available if there is no hydrogen supplying material.

3. There is developed process available for producing alcohol with low costs. Sugarcane, maize, sweet broomcorn, cassava, musty food are all inexhaustible regenerative resources for producing methanol and ethanol.

4. Using hydrogen as the fuel, a hydrogen engine has a relatively high thermal efficiency in work condition of medium and low load (one time more than that for an oil-fueled engine). Thus, a hydrogen engine expands the covering range of an optimal work condition of an overall machine so that the changeover losses of energy caused by charging and discharging the electric motor and the battery.

5. The present invention can enable the life cycle of a hybrid power vehicle to be extended from 20 years to more than 120 years.

6. The principle, technology and process of onboard producing and supplying hydrogen by catalyzing and cracking alcohol using the afterheat of exhaust gases of an engine is also applicable to a fuel cell electric vehicle.

BRIER DESCRIPTION OF DRAWINGS

A detailed description will now be given to the present invention referring to the figures and the embodiments shown in the figures. However, the present invention is not limited to the embodiments shown in the figures.

FIG. 1 is an illustrative diagram showing the structure of a hydrogen hybrid power electric vehicle according to the present invention having a hybrid power system in parallel connection. Said hydrogen hybrid power electric vehicle is different from conventional hybrid power electric vehicle in that a hydrogen engine (31) is used to replace a standard oil-fueled engine (no modification is made to the original oil-fueled engine for the hydrogen engine other than that a hydrogen control valve, i.e., a hydrogen nozzle is used to replace the oil nozzle supply system). The remaining combined configuration of the electric motor (II), the battery group (III) as well as related vehicle cold-starting and drive power coordination control etc. is substantially the same as that of the original vehicle.

FIG. 3 is a cross-sectioned perspective view taken in the direction of A-A of a vaporizer overheating chamber (26) of the alcohol cracking hydrogen generator (1) shown in FIG. 2;

FIG. 4 is a cross-sectioned perspective view taken in the direction of B-B of a reaction chamber (16) of the alcohol cracking hydrogen generator (1) shown in FIG. 2;

FIG. 5 is a cross-sectioned perspective view taken in the direction of C-C of a silencer of the alcohol cracking hydrogen generator (1) shown in FIG. 2;

FIGS. 2-5 are illustrative views showing the structure of the key equipment, i.e., the alcohol cracking hydrogen generator (1) of the present invention. No other modifications need to be done to the structural elements of a modern hydrogen engine (for example, 750 HL direct injection hydrogen engine produced by BMW), except that an alcohol cracking hydrogen generator (1), which has the dual functions of producing hydrogen by cracking alcohol and a silencer, has to be provided in serial connection on the line of an exhaust pipe (2). The alcohol cracking hydrogen generator (1) first catalyzes and cracks the fuel alcohol by using the afterheat of the exhaust gases of the engine so as to change alcohol into hydrogen and then drives the vehicle to run by using hydrogen ($3H_2+CO_2$) as the fuel for the engine.

Figure 1:
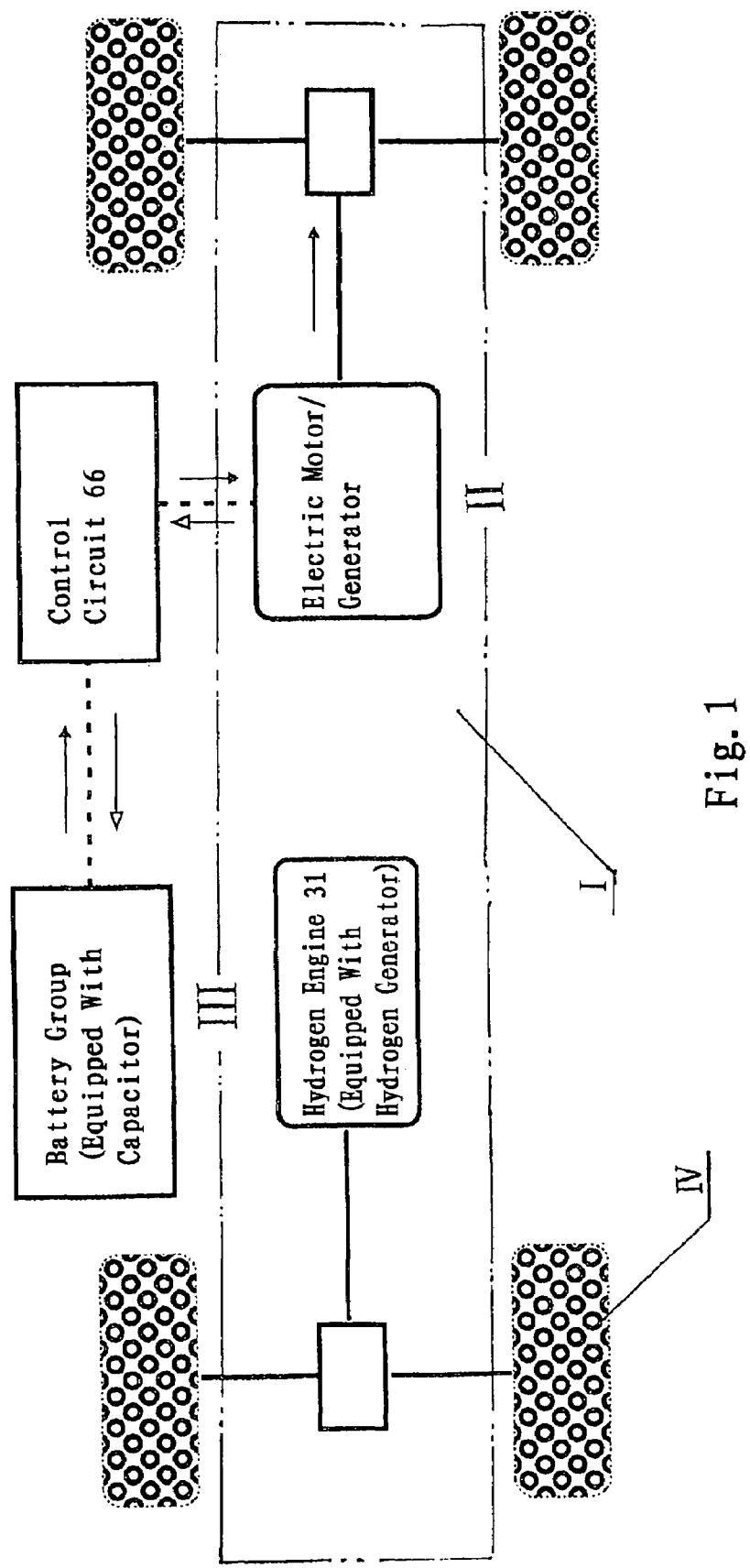
Figure 2:
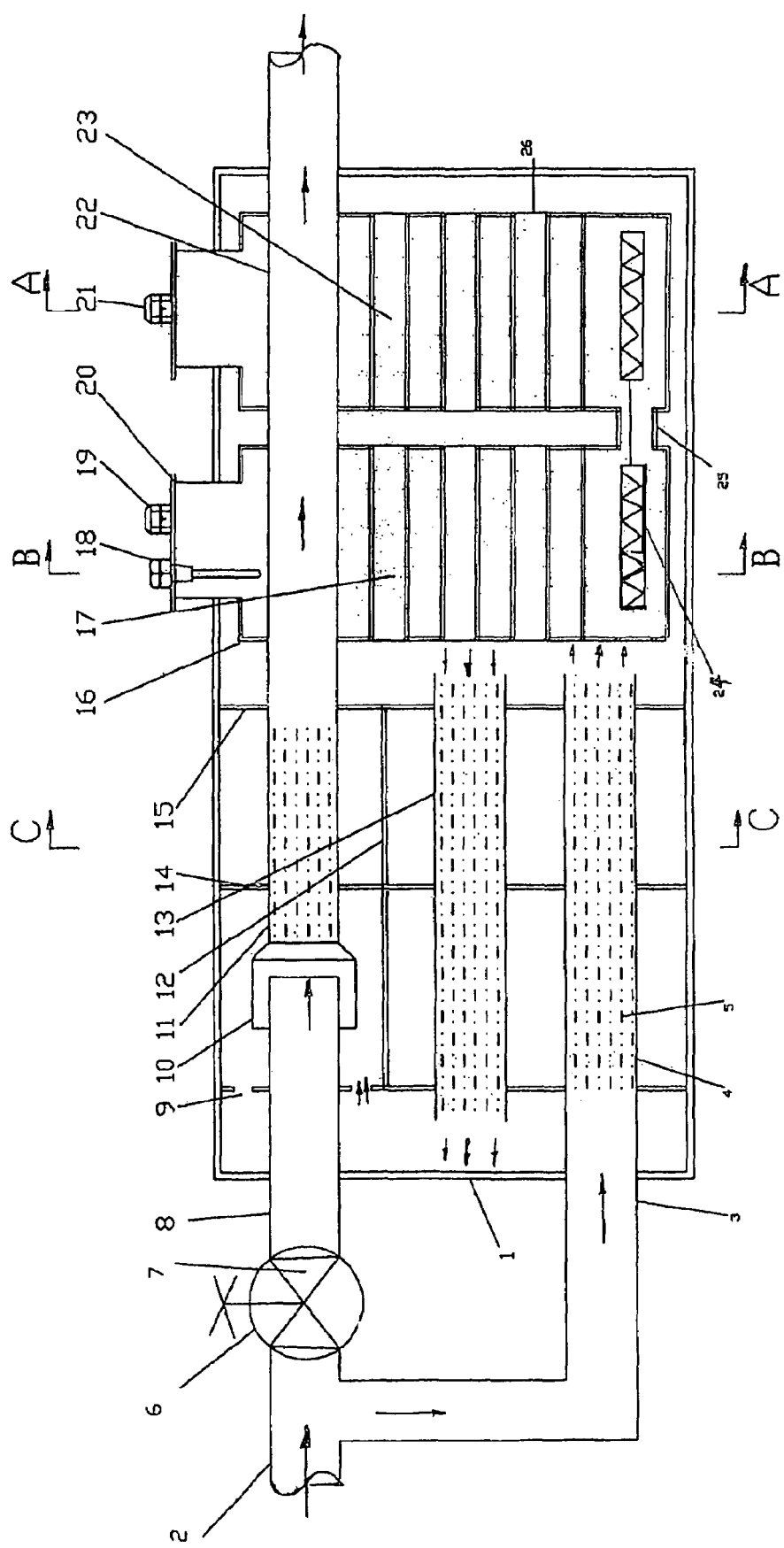
FIG. 2 is an illustrative diagram showing the structures of an alcohol cracking hydrogen generator and a silencer.
Figure 6:
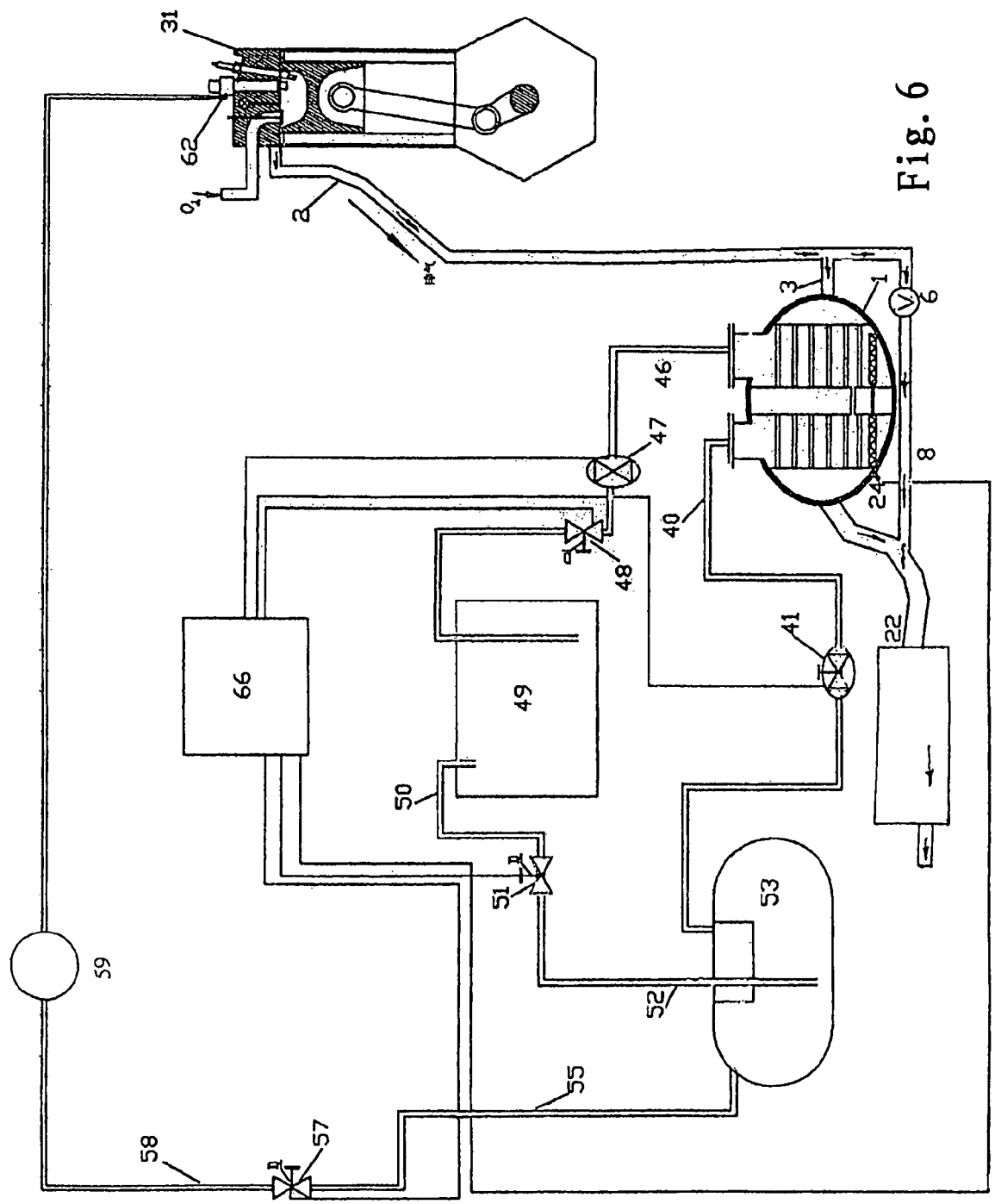

FIG. 6 is a workflow chart of the alcohol cracking hydrogen generator (1) of the hydrogen engine according to the present invention producing and supplying hydrogen.

The hydrogen producing and supplying system of the alcohol cracking hydrogen generator (1) comprises the following components: a hydrogen engine (31), an alcohol cracking hydrogen generator (1), an alcohol container (49), an alcohol pump (47), a low-pressure hydrogen pump (41), a hydrogen containing canister (53) (a hydrogen storing dephlegmator W), a control valve (57), a pressure stabilizer valve (59), a hydrogen control valve, i.e., a hydrogen nozzle (62) electromagnetic valve and a micro-computer controlled control circuit (66).

In order to prompt the catalyst bed of the alcohol cracking hydrogen generator to have its temperature to rise rapidly so as to reach the work temperature required for producing hydrogen by cracking alcohol when the engine of a vehicle is being cold started, a cold-starting electric heater (24) is provided at the bottom of the reaction chamber (16) and the vaporizer overheating chamber (26). The cold-starting electric heater (24), which can be either of a micro-wave heater or an infrared radiation heater, receives signals transmitted by a thermoelectric couple and is controlled by a micro-computer.

The vaporizer overheating chamber (26) and the reaction chamber (16), which are made of copper, stainless steel or corrosion-proof cast iron material, are in the form of completely enclosed cylindrical shells with front and rear surfaces thereof evenly disposed with perforating array pipes (17, 23) in round comby shape. The vaporizer overheating chamber (26) is in communication with the bottom of the reaction chamber (16) through a communicating pipe (25). The bottom of the reaction chamber (16) is filled with metal wire web and magnetic ring. The spaces inside the reactor chamber (16) and that between outer walls of the perforating array pipes (17) are filled with alcohol cracking catalyst.

The vaporizer overheating chamber (26) is welded on the top thereof with an interface for an alcohol inlet pipe (21), an outer end of which is connected to the alcohol inlet pipe (46) of the alcohol container (49).

The flange cover on the top of the reaction chamber is welded with an interface for the alcohol cracking gas (include rich content of hydrogen) outlet pipe (19), which is connected to the low-pressure hydrogen pump (41), the hydrogen containing canister (53), the stabilizer valve (59) and the hydrogen nozzle (62) on the engine cylinder head (or connected to a mixer on a carburetor-like engine inlet pipe, which is not shown in the figure). The reaction chamber (16) is provided on the top with a cover (20) through which a catalyst can be filled. A screwed pipe is welded on a hole in the cover (20) for receiving therein the thermoelectric couple (18). The thermoelectric couple has its line connected to a thermal control electronic meter.

In order to improve the efficiency of the generator (1) cracking alcohol, a return flow system for alcohol liquid re-cracking is provided in the alcohol cracking system to process the alcohol condensate possibly left in the hydrogen containing canister (53) which is not cracked. When the alcohol condensate reaches a certain amount, an electronic controller of the control circuit (66) commands to open the control valve (51) so that the alcohol condensate under high pressure in the hydrogen containing canister (53) returns to the low-pressure alcohol container (49) via the bottom insertion pipe (52), the control valve (51) and the alcohol pipe (50).

DETAILED DESCRIPTION OF PREFERRED EMBODIMENT

When the hydrogen hybrid power electric vehicle starts up, first, the electronic controller of the control circuit (66) commands to switch on the electric power supply for the cold-starting electric heater (24) of the alcohol cracking hydrogen generator (1) to provide heat for the rapid rise of the temperature of the catalyst bed of the vaporizer overheating chamber (26) and the reaction chamber (16). The temperature reaches the required value in about two minutes in the condition that the battery group onboard the vehicle maintains a sufficient electric voltage (30-50 kilowatts). The automatically-controlled meter of the control circuit can command to start the alcohol pump (47) at any time so that alcohol fuel enters the vaporizer chamber (26) to be heated and vaporized via the interface for the alcohol inlet pipe (21). The vaporized alcohol fuel passes through the communicating pipe (25) and the metal wire web to enter the reaction chamber (16) so as to contact the catalyst and passes through the catalyst bed to be catalyzed and cracked into a gas rich in hydrogen (with $H_2$ and $CO_2$ as its main content). The gas rich in hydrogen is then pressurized to 8-12 MPa by the hydrogen pump (41) and purified by the hydrogen storing dephlegmator (W) before being stored in the hydrogen containing canister (53). Finally, hydrogen is injected directly into the cylinder as fuel for the engine to drive the vehicle to run according to requirements of work condition of the engine and with commands from the computer of the control circuit (66). Once the temperature of the catalyst of the reaction chamber (16) in the alcohol cracking hydrogen generator (1) reaches the required value (200° C.-300° C.), the temperature and heat necessary for the performance of producing hydrogen by cracking alcohol in the vaporizer overheating chamber (26) and the reaction chamber (16) can be entirely supplied continuously and reliably making use of the afterheat of the exhaust gasses emitted by the hydrogen engine, and at the very moment, the control circuit (66) can command to switch off the electric power supply for the battery group (III) so that the cold-starting electric heater (24) stops working. The above-mentioned is the work process of a hydrogen hybrid power electric vehicle which combusts hydrogen produced by cracking alcohol instead of gasoline or diesel in order to fulfill the purpose of the present invention.

The following is another way in which a hydrogen hybrid power electric vehicle according to the present invention starts up cold-starting:

First, the control circuit (66) is switched on as required by load of work condition and the computer commands to open the control valve (57) so that the hydrogen storing material pre-stored in the hydrogen storing dephlegmator (W) contained in the hydrogen containing canister (53) supplies hydrogen instantly. The hydrogen supplied passes through the high-pressure hydrogen outlet pipe (58), the stabilizer valve (59) and the hydrogen control valve, i.e., the hydrogen nozzle (62) before being injected into the cylinder of the hydrogen engine (31) so that the hydrogen engine (31) starts running to generate power and emits exhaust gasses. The exhaust gasses emitted by the hydrogen engine (31) pass through the exhaust gas inlet pipe (3) at the entrance of the pipe of the alcohol cracking silencer before entering the alcohol cracking hydrogen generator (1) and then pass through the perforating array pipes (17, 23) of the reaction chamber (16) and the vaporizer overheating chamber (26) and further, the intermediate silencer pipe (13) to be directed into the silencer end pipe (22) so as to be finally emitted into the atmosphere. The exhaust gases emitted by the running hydrogen engine (31) heat the vaporizer overheating chamber (26) and the reaction chamber (16) rapidly and in about 2 minutes, the temperature within the alcohol cracking hydrogen generator (1) reaches the required value so that it can produce hydrogen by itself. Similarly, the purpose of the present invention is thus achieved that a vehicle is driven by combusting hydrogen produced by using alcohol instead of any gasoline or diesel.

The exhaust gasses emitted are silenced when passing through the silencer pipes (11, 13) while supplying heat for the catalyst bed by heating the outer walls of the shell bodies of the vaporizer overheating chamber (26) and the reaction chamber (16) and the inner walls of the perforating array pipes (17, 23). As the process of alcohol cracking involves heat-absorption reaction which needs to consume a large quantity of afterheat brought with the exhaust gases, not only the temperature and pressure of the emitted exhaust gases are then decreased but also the noise produced thereby is reduced with coordinated functioning of the silencers (11, 13). When the signal transmitted by the thermoelectric couple indicates that the temperature of the catalyst bed is higher than the required value, in order to avoid overheating of the catalyst which may affect activeness and life cycle, the automatically-controlled meter in the control circuit (66) commands to open the exhaust bypass valve to have part of the high-temperature exhaust gases to directly enter the exhaust bypass pipe (8) so as to be emitted by way of the silencer end pipe (22).

1—alcohol cracking hydrogen generator
2—exhaust pipe
20—cover
21—interface for the alcohol inlet pipe
22—silencer end pipe
23—perforating array pipe
24—cold-starting electric heater
25—communicating pipe 26—vaporizer overheating chamber
3—exhaust gas inlet pipe
31—hydrogen engine
4—exhaust silencer pipe
41—hydrogen pump
46—alcohol inlet pipe
47—alcohol pump
48—control valve
49—alcohol container
5—exhaust silencer hole
50—alcohol pipe
51—control valve
52—bottom insertion pipe
53—hydrogen containing canister
55—hydrogen outlet pipe
57—control valve
58—hydrogen outlet pipe
59—stabilizer valve
6—exhaust bypass valve
7—exhaust disk valve
62—hydrogen nozzle
66—control circuit
8—exhaust bypass pipe
9—silencer throughhole baffle
10—exhaust passage joint
11, 13—silencer pipe
12, 14, 15—silencer baffle
16—reaction chamber
17—perforating array pipe
18—thermoelectric couple
19—interface for the hydrogen outlet pipe
I—chassis
II—electric motor
III—battery group
IV—wheel

What is claimed is:

1. A hydrogen hybrid power electric vehicle comprising:

a chassis, wheels, an engine, an electric motor, a battery group, a fuel tank, a control circuit and various kinds of control valves connected to the lines of the control circuit, wherein said engine is a hydrogen engine, an outlet line of the battery group is connected to a cold-starting electric heater which is in serial connection in an alcohol cracking hydrogen generator on the line of an exhaust pipe of the hydrogen engine, an exhaust outlet pipe of the hydrogen engine is connected to an alcohol cracking hydrogen generator which is further connected to a silencer end pipe through an exhaust bypass valve, a hydrogen outlet pipe of the alcohol cracking hydrogen generator is connected to a hydrogen nozzle at an inlet end of the hydrogen engine and an alcohol inlet pipe of the alcohol cracking hydrogen generator is connected to an alcohol container, wherein said hydrogen hybrid power electric vehicle is powered by the said hydrogen engine in combination with said electric motor, wherein the alcohol cracking hydrogen generator comprises an external alcohol container, a hydrogen containing canister, the alcohol inlet pipe, hydrogen outlet pipes, control valves, a hydrogen pump, a pressure stabilizer valve and a control circuit, in which the alcohol inlet pipe has one end connected to the alcohol container and the other end connected to the inlet end of the alcohol cracking hydrogen generator, the hydrogen outlet pipe has one end connected to an outlet end of the alcohol cracking hydrogen generator and the other end connected to the hydrogen containing canister and a hydrogen pressure stabilizer valve is provided between the hydrogen outlet pipe and the hydrogen nozzle at the inlet end of the engine, wherein the exhaust pipe of the hydrogen engine branches off outside the alcohol cracking hydrogen generator into an exhaust inlet pipe and an exhaust bypass pipe, the exhaust bypass pipe is provided with an exhaust bypass valve, the cylinder-shape alcohol cracking hydrogen generator is provided therein with an exhaust passage joint, a silencer end pipe, an exhaust silencer hole, an exhaust silencer pipe, a silencer throughole baffle, silencer pipes, silencer baffles, a reaction chamber and a vaporizer overheating chamber, in which the reaction chamber is in communication with the vaporizer overheating chamber through a communicating pipe, the reaction chamber and the vaporizer overheat chamber are provided at the bottom thereof with a cold-starting electric heater, the reaction chamber and the vaporizer overheat chamber are provided at the top thereof with a thermal control thermoelectric couple, an interface for the hydrogen outlet pipe and an interface for the alcohol inlet pipe, and wherein a flange cover of the reaction chamber is welded with the interface for the hydrogen outlet pipe, the interface for the hydrogen outlet pipe is connected to the hydrogen pump, the hydrogen containing canister, the hydrogen stabilizer valve and the hydrogen nozzle on the engine cylinder head or a mixer on a carburetor-like engine inlet pipe, the reaction chamber is provided on the top thereof with a cover in which catalyst can be filled, a screwed pipe is welded on a hole in the cover for receiving therein the thermal control thermoelectric couple, the thermal control thermoelectric couple has its line connected to a thermal control electronic meter, the bottom of the reaction chamber is filled with metal wire web and magnetic ring and the spaces inside the reactor chamber and that between outer walls of perforating array pipes are filled with alcohol cracking catalyst.

2. A hydrogen hybrid power electric vehicle as defined by claim 1, wherein the vaporizer overheating chamber is welded on the top thereof with the interface for the alcohol inlet pipe, an outer end of which is connected to the alcohol container and the alcohol inlet pipe.

3. A hydrogen hybrid power electric vehicle as defined by claim 1, wherein the vaporizer overheating chamber and the reaction chamber of the hydrogen engine, are in the form of completely enclosed cylindrical shells with front and rear surfaces thereof evenly disposed with perforating array pipes said vaporizer overheating chamber and reaction chamber made of copper, stainless steel, or corrosion-proof cast iron material.

4. A hydrogen hybrid power electric vehicle as defined by claim 1, wherein the materials used by the hydrogen engine for producing hydrogen are alcoholic material, which are mainly composed of hydrous methanol, ethanol, mixed alcohol or non-sulfuric hydrocarbon with a ratio of alcohol to water as 1:0-1.17.

5. A hydrogen hybrid power electric vehicle as defined by claim 1, wherein a return flow system for alcohol re-cracking composed of a bottom insertion pipe, an electromagnetic valve, and an alcohol pipe is provided.

6. A hydrogen hybrid power electric vehicle as defined by claim 1, wherein a hydrogen storing dephlegmator is provided in the hydrogen containing canister, and said hydrogen storing dephlegmator contains therein hydrogen storing materials, which can be selected from any of the following hydrogen storing materials; platinum, palladium, titanium and nickel alloy, active carbon and nano-carbon fibre.

7. A hydrogen hybrid power electric vehicle as defined by claim 1, wherein the cold-starting electric heater is either of a micro-wave heater or an infrared radiation heater with a capacity of 1.5-3 KW and the alcohol cracking hydrogen generator cracks alcohol at a temperature in the range of 200° C.-300 ° C.

* * * * *